Jan. 16, 1968     R. KEMMETMÜLLER     3,364,009
METHOD FOR THE PRODUCTION OF IRON AND STEEL
Filed March 12, 1964     4 Sheets-Sheet 1

INVENTOR.
R. KEMMETMÜLLER
BY Steinberg + Blake
ATTORNEYS

Jan. 16, 1968  R. KEMMETMÜLLER  3,364,009
METHOD FOR THE PRODUCTION OF IRON AND STEEL
Filed March 12, 1964  4 Sheets-Sheet 2

INVENTOR.
R. KEMMETMÜLLER
BY Steinberg & Blake
ATTORNEYS

Jan. 16, 1968  R. KEMMETMÜLLER  3,364,009
METHOD FOR THE PRODUCTION OF IRON AND STEEL
Filed March 12, 1964  4 Sheets-Sheet 3

INVENTOR.
R. KEMMETMÜLLER
BY Steinberg + Blake
ATTORNEYS

Jan. 16, 1968  R. KEMMETMÜLLER  3,364,009
METHOD FOR THE PRODUCTION OF IRON AND STEEL
Filed March 12, 1964  4 Sheets-Sheet 4

INVENTOR.
R. KEMMETMÜLLER
BY *Steinberg & Blake*
ATTORNEYS

United States Patent Office 3,364,009
Patented Jan. 16, 1968

3,364,009
METHOD FOR THE PRODUCTION OF
IRON AND STEEL
Roland Kemmetmüller, Vienna, Austria
(1219 Carlton House, Pittsburgh, Pa. 15219)
Filed Mar. 12, 1964, Ser. No. 351,417
5 Claims. (Cl. 75—25)

My present invention relates to a method of and apparatus for the production of iron and steel and, more particularly, to improvements in iron plants adapted to produce pig iron from iron ore and/or convert pig iron to steel.

In general, an iron-manufacturing plant of the character described comprises one or more blast furnaces, which are charged successively and repeatedly with the iron ore, a flux such as limestone, and a source of reducing medium such as coke. The pig iron tapped from the base of the furnace is then cast into ingots or, more commonly, carried in ladles or the like by suitable cranes to a mixing vessel in which scrap iron is dissolved in the pig-iron melt. In some cases the ladle itself serves as the mixing vessel and retains the crude iron until alloying ingredients and/or scrap iron, in liquid or solid form, have been added. From the mixing vessel the iron melt is carried, again generally by ladles and suitable cranes, to the steel-making means which may be an open-hearth (Siemens-Martin) furnace or a converter of the Bessemer or Thomas type. In the converter, the molten iron is subjected to a stream of oxygen which burns off residual sulfur, phosphorus and other impurities as well as excess carbon to produce steel. From the converter or open-hearth furnace the steel can be subjected to further purification in, for example, an electric-arc furnace or can be cast into ingots which can be stored or rolled in the usual rolling mills with or without soaking to equalize the temperature of the ingot. It has also been proposed to cast continuously the liquid steel derived from the converters into sheets at the conclusion of the steel-making treatment.

In conventional blast-furnace steel-making processes, the iron oxide/limestone/coke charge is subjected to temperatures of about 1300–1500° C. in the region of the smelting zone, these temperatures being sufficient to melt the iron and slag, which have been produced by reduction of iron oxide by carbon monoxide or elemental carbon at an upper level of the furnace, whereupon these molten products are collected at the base of the furnace for periodic tapping. At the high temperature of the smelting zone, silicon dioxide reacts with carbon, present in the form of coke, to produce elemental silicon which is partly found in the slag and partly in the molten iron therebelow. Iron sulfide reacts in this region with the calcium oxide produced by decomposition of limestone to yield free iron and carbon monoxide, manganese oxide and sulfurous oxides reacting in a similar manner. The blast air introduced by way of the tuyères in the smelting zone and intermediate the latter and the slag bath reacts with the coke to produce carbon monoxide which rises in the furnace and, at an intermediate level along the furnace shaft, reacts with FeO present in the iron ore or formed by reduction of $Fe_2O_3$ to yield reduced iron and carbon dioxide. The carbon dioxide also reacts with coke to produce further quantities of carbon monoxide which, at a higher level in the furnace, reduces $Fe_2O_3$ of the ore to metallic iron and FeO as indicated.

In order to maintain a satisfactory heat balance in the smelting zone at a level capable of sustaining the high temperatures required therein, the air blast forced into the furnace through the tuyères must be conventionally supplied at an elevated pressure (above about 2 atmospheres) and with a high velocity on the order of $10 \times 10^3$ cubic meters ($m.^3$) per hour. Since the supplying of air at ambient temperatures would cause a reduction in the temperature of the smelting zone, by virtue of the specific heat and heat capacity of the air, the blast air of conventional iron-making plants must generally be brought to a temperature of at least 800° C. to 1000° C. For this purpose, a blast furnace installation is generally provided with several large tower-like air heaters in which heat of the blast furnace exhaust gas is regeneratively used to raise the temperature of the incoming blast air. Since the exhaust gas contains large quantities of carbon monoxide, additional heat can be obtained from the exhaust gas by burning it within the Cowper-like heating ovens. It is not uncommon for a single blast furnace to require four or more of these recuperative blast-air preheaters. The preheaters are usually provided with lattices of refractory material capable of acting in a heat-exchanging manner to absorb heat from the furnace exhaust gas and supply it to the blast air when the gases are successively led through the oven. Since the ovens may be used alternately for heating the blast gas and deriving heat from the exhaust gas, even further expenses may be incurred in providing the extra heating capacity. In a blast-furnace installation of the character described, it is not infrequent that the blast-air preheaters make up 30% of the capital cost of the installation.

Other disadvantages are also manifest in conventional iron and steel plants. For example, the molten metals are usually conveyed between the treatment stages (i.e. blast furnace and mixer, mixer and converter, and converter and ingot-casting stage) by ladles and cranes adapted to receive a molten batch at one production stage and convey this batch in a ladle to a successive stage, the ladle being then dumped. In high-capacity steel-producing plants, therefore, it is not uncommon for the cranes and ladles frequently to interfere with one another and occupy so much space in the region of the processing apparatus that output of the steel plant is reduced. Yet a further problem encountered in the iron and steel plant is the treatment of the waste gases thereof (especially the blast-furnace exhaust gas). While it is known that the exhaust gases of blast furnaces have considerable value, especially with respect to the minute particles of iron oxide carried thereby and its carbon monoxide content, conventional methods of dealing with these gases have proved to be highly uneconomical. Thus, in one conventional arrangement, the gas is passsed into a cyclonic dust separator for removal of the iron-oxide particles, which are filtered out, the gas then being washed in water sprays prior to use as a combustion gas in Cowper- or Martin-type furnaces or in recuperative heaters for various purposes. By these complicated prehandling methods, however, a large part of the sensible heat of the furnace exhaust gases is lost.

It is, therefore, an important object of the present invention to provide, in an iron and steel installation having a blast furnace, a method of producing pig iron without the need for regenerative heaters of the considerable capacity hitherto required. A corollary object of this invention is to provide a method of producing pig iron in which the volume of the blast gases moved through the system can be considerably reduced.

Another significant object of the present invention is to provide an iron and steel plant which is unencumbered by the plethora of cranes, ladles and the like characterizing earlier systems. A subsidiary object, in this respect, is to provide a method and means, in an iron-manufacturing plant, for improving the conveyance of materials between successive stages of the manufacturing process.

Still another object of this invention is to provide a method of improving the value and utility of waste gases of an iron and steel installation.

These objects, and others which will become apparent hereinafter, are attained in accordance with one aspect of the present invention, by a method of treating iron ore, coke and limestone in a conventional blast furnace to produce crude or pig iron which involves the use of a blast gas enriched in oxygen and containing at least 80% by volume oxygen and preferably between substantially 80 and 90% by volume although excellent results are obtained when gases enriched in oxygen up to and including 99.9% are employed. Thus it is a significant feature of the present invention to introduce an oxygen-rich blast gas into the furnace through its tuyères instead of the usual blast air. Surprisingly, the use of a blast gas containing upwardly of 80% oxygen permits the blast gas to be introduced into the furnace at temperatures from ambient up to about 500–600° C. without reduction of the temperature of the blast-furnace smelting zone. In fact, the oxygen-rich blast gas can be introduced in substantially smaller quantities which, together with the reduced blast-gas temperature, permits all or some of the Cowper-type heaters to be dispensed with. By eliminating the major fraction of the nitrogen present in conventional blast air, through the use of the present method, it is possible to reduce significantly the amount of oxygen which is wasted in heating the nitrogen to the smelting-zone temperature. Thus it may be observed that the quantity of oxygen-enriched gas supplied to the blast furnace calculated in terms of its oxygen content can be significantly less than the quantity of the conventional blast air, again calculated in terms of its oxygen content, in spite of the fact that the usual blast air has considerable heat value at a temperature of 1000° C. Further economies are realized by elimination of the large-capacity blowers required for the injection of blast air as well as by reducing the large quantities of fuel necessary to burn the exhaust gas which, at a temperature of 500–600° C. (i.e. the desired temperature of the oxygen-rich blast gas) can be passed in heat-exchanging relationship with the blast gas without further combustion although some combustion is desirable. The exhaust gas itself, because it need not be fully burned to heat the blast gas, has a greater value for use in other processes.

It is another feature of the present invention to provide, in a system of the character described, means for intermittently or continuously enriching the blast air with regard to its oxygen content in such manner as to compensate for the lowering of the inlet temperature of the blast air. For example, the smelting zone of the furnace can be provided with a temperature-sensitive device, such as a pyrometer, for controlling the admixture of pure or substantially pure oxygen with the blast air in accordance with the smelting-zone temperature when the blast air is introduced at a temperature below 800° C. Moreover, I have found that any tendency toward overheating in the region of the tuyères and the smelting zone can be controlled by adding to the oxygen-rich blast gas up to 10% water vapor, preferably at the tuyères, in cases in which the resulting iron tends to be low in carbon. The addition of water vapor is advantageous since the water vapor reacts with carbon to produce carbon monoxide and reducing hydrogen. The water vapor promotes the reducing process, as previously indicated, and can be provided in the form of saturated steam or supersaturated steam which is introduced into the furnace at the tuyères or at various locations upwardly along the furnace shaft to control the temperatures therealong. A particularly effective method of introducing the water vapor is to provide it as saturated steam at an elevated pressure (say 50–75 atmospheres) and to use the high-pressure steam in an injector- or Venturi-type pump to entrain the oxygen-rich blast gas into the furnace. It is thus possible to eliminate or reduce the need for blowers or compressors.

According to another aspect of this invention, an iron and steel plant of the character described includes a blast furnace for producing crude iron, a mixing vessel for combining the crude-iron melt with scrap iron or steel or alloying ingredients, a converter for producing steel for the mixed raw iron and an ingot-pouring arrangement, or any group of these successive stages for the treatment of a melt. A significant feature of the invention resides in the provision of the successive stages with horizontal spacing at successively lower levels whereby the molten metal can flow from an earlier-stage processing apparatus to a subsequent-stage device solely under the influence of gravity and without the intervention of ladles or cranes. Thus, a more specific characteristic of this aspect of the invention resides in the provision of swingable guide channels, troughs and spouts between successive stages for directing the flow of the molten metal to a subsequent stage. Thus the plant can be constructed in a hilly terrain with the blast furnace located so that its tap hole for the raw iron is disposed above the inlet to the mixing vessel, which is also laterally offset from the blast furnace. The location of the latter is preferably so chosen that the use of upwardly inclined skip loaders can be eliminated and the furnace charged with ore, coke and limestone from a level at or above the inlet mouth (top) of the furnace.

Thus, the blast furnace, mixer and converter can be arranged in stepped relationship, both the latter being swingable to direct the molten-metal charge from the mixer into the Thomas or Bessemer converter. Upon conclusion of the steel-making process in the latter, the converter can be tilted to direct the melt into an ingot mold. It is a subsidiary feature of this invention to provide a collecting pan or crucible intermediate the converter and the ingot mold for collecting the melt discharged from the converter and then dumping it into the ingot mold in a single operation or between the mixer and the converter for a similar purpose.

Still another feature of this invention resides in the improvement of the exhaust gases of the blast furnace by removing therefrom a substantial proportion of the iron and iron-oxide particles entrained thereby without significant diminution of the sensible heat of the exhaust gas. This result is obtained by a process which involves the removal of the particles by melting them in the exhaust gas and collecting the molten metal derived from agglomeration of the particles concurrently with smelting. The exhaust gas can be further heated in the course of the step and then employed to preheat the oxygen-enriched blast gas and to generate the water vapor used, as previously mentioned in admixture with the blast gas. If sufficient heat is provided by the exhaust gas to produce water vapor in quantities in excess of those required for admixture with the blast gas, the additional water vapor can be employed to drive a turbine which, in turn, can be coupled with a blower for supplying the oxygen-rich gas to the blast furnace.

The above and other objects, features and advantages of the present invention will become more readily apparent from the following description, reference being made to the accompanying drawing in which.

Figure 1:
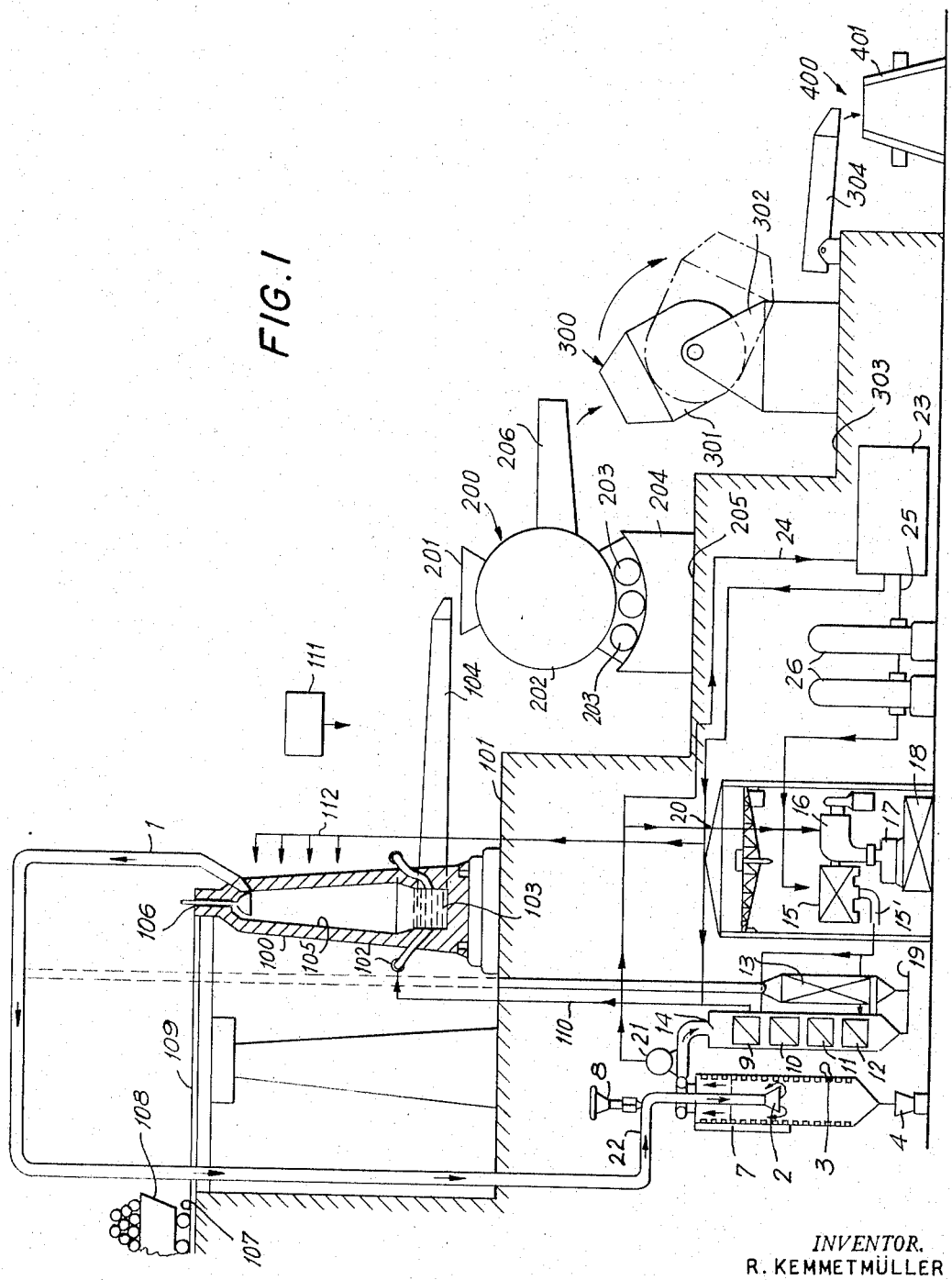
FIG. 1 is a diagrammatic elevational view of a steel-producing plant, according to the invention, with parts shown in section.

In FIG. 1 I show a steel-making plant comprising a blast furnace 100, a crude-iron mixing stage 200, a steelmaking converter stage 300 and an ingot-casting stage 400 arranged in step-like configuration in, for example, a hilly terrain. The blast furnace 100 is mounted upon an upper level 101 of the ground and is provided with the usual tuyères 102 for introducing an oxygen-rich blast gas into the furnace in the usual manner. The melt or bath of iron 103 can be tapped via a conventional tap hole so that the molten metal flows by gravity through a trough 104 into the inlet 201 of a mixing vessel 202 which is pivotally mounted on rollers 203 upon the base 204 rising from a platform 205 below the level 101. The pouring spout 206 of the mixing vessel can be tilted downwardly to direct a stream of molten metal into the converters 301 (only one of which can be seen in FIG. 1) which are mounted upon trunnions 302 for swinging movement between extreme positions, indicated in solid and broken lines, respectively, in FIG. 1. The trunnions 302 are supported upon a lower level 303 of the stepped terrain, this level being provided further with receptacles 304 capable of temporarily retaining the steel-melt and of distributing it to a plurality of ingot molds 401 disposed therebelow. Beneath the blast furnace 100, there is disposed the blast-gas supply arrangement as well as means for recuperatively heating the blast gas with the exhaust gas. This system will be described in further detail hereunder. The conventional skip-loading mechanism for charging the furnace chamber 105 alternately with ore, coke, and limestone can be dispensed with when the charging inlet 106 of the blast furnace is disposed at or below a higher level 107 of the terrain upon which supplies of the charge are stored. The charge can thus be trundled to the blast furnace by, for example, carts 108 displaceable along tracks 109 for dumping into the furnace.

Figure 2:
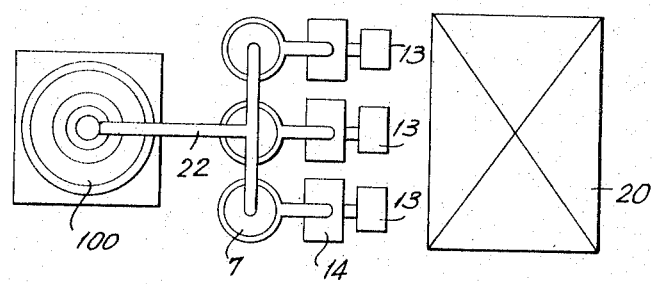
FIG. 2 is a flow diagram showing waste-gas treating towers in top-plan view.

The furnace exhaust gas, generally at a temperature above about 400° C. and below about 600° C., containing substantial quantities of dust-like impurities (including iron-oxide particles), is led via an exhaust conduit 1 from the blast furnace through a pipe 22 at which, should the combustion value of the exhaust gas be low, additional fuel (rich in reducing consistuents such as methane, carbon monoxide or hydrogen) can be added at 8. As is evident from FIG. 2, pipe 22 leads to three smelting and reaction vessels 7, two of which can be in constant use while the other is maintained in reserve. The exhaust gas containing iron-oxide particles, carbon monoxide and, if desired, fuel introduced at 8, burns initially in the region of the outlet 2 of conduit 22 in smelting chamber 7 with a reducing flame which converts the iron-oxide particles into particles of elemental iron.

Oxygen is introduced into the chamber at 3 by, for example, an annular array of tuyères to sustain, at this lower zone of chamber 7, a temperature sufficient to smelt the iron-particles formed in the reducing zone to molten iron which then passes into a trough 4 from which the iron can be led off for further processing. According to an important feature of this invention, the molten iron derived from the smelting chamber is combined with the blast-furnace melt prior to introduction into the mixing vessel or the steel-making converters.

The oxygen-enriched blast gas supplied to the tuyères 102 via a diagrammatically illustrated conduit 110 can be preheated in a heat exchanger 9 by the sensible heat of the waste gas supplied to the heat-exchanger tower chamber 14 from the smelting vessel 7 in which the temperature of the exhaust gas is not reduced by the particle-smelting process and may, in fact, event be elevated. The input to heat exchanger 9 derives from a blower 15 which, under certain conditions, may be dispensed with. The blower 15 also supplies oxygen-containing gas to another heat-exchanger section 12 of the tower 14 in which the temperature of this gas is raised prior to its introduction into the smelting chamber 7 at tuyères 3. Additional heat exchanger sections 10 and 11 can be provided to produce or heat water vapor for introduction into the blast furnace together with the blast gas. It is preferred, however, to provide the smelting chamber 7 with walls of ceramic tubes (as diagrammatically illustrated in FIG. 3) which form a boiler together with the water reservoir 21, capable of producing saturated steam or superheated steam at a pressure ranging between 50–100 atmospheres (preferably 50 to 70 atmospheres). This steam can be supplied to an oxygen generator 23 via line 24 to serve as a motive force for the blast gas when such a generator is used or, in the event it is desired to employ the blower 15, as the sole motive force for blast air, the generator 23 can be connected to the blower via conduit 25. The oxygen source may also include tanks 26 for adding oxygen to the blast gas in accordance with the temperature in the smelting zone.

The blast gas of the present invention, containing upwardly of 80% oxygen, is fed to the blast furnace at a temperature below substantially 600° C. and preferably in the range of 500–600° C. The steam from boiler 21, if in excess over the amount necessary for addition to the blast furnace, can be used to drive a steam turbine 16 to operate the blower 15. The turbine 16 is provided with the usual condenser 17 and with the water-preparing device 18 while the outlet pipe 15′ of blower 15 communicates with the heat exchanger 9. The turbine and blower arrangement is contained within a housing 20. The waste gas from the heat-exchanging chamber 14 passes via line 19 into a dust-collector or filter 13 from which the gases emerge with a minimum of pollution effect (up to 100 mg. of dust per m.³). The temperature in the region of the smelting zone of chamber 7 ranges between 1500–2000° C. The ceramic tubes of chamber 7, for heating the water vapor, can be composed of acidic or basic material so as to serve as Bessemer or Thomas-like linings in which case the iron melt is obtained in the form of steel. To facilitate the smelting of the iron particles, flux may be added to the smelting chamber together with the fuel at 8. Water vapor can also be added at vertically spaced locations along the furnace shaft (arrows 112) to regulate the reaction temperatures at these locations.

Figure 3:
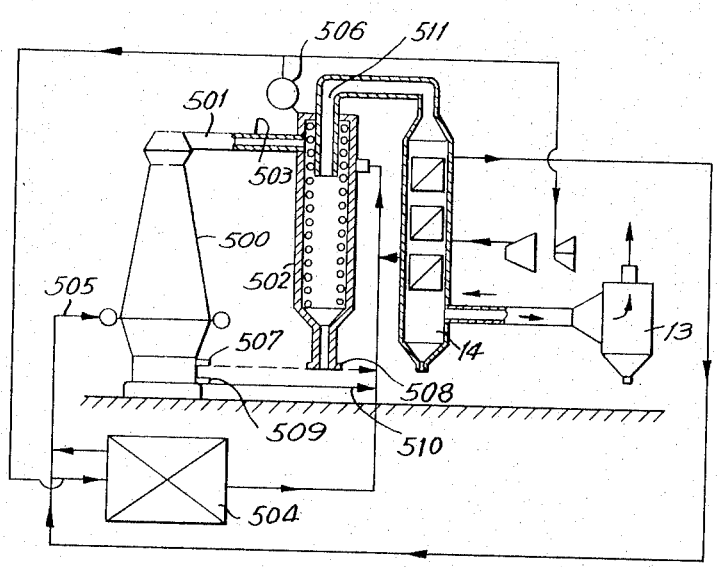
FIG. 3 is a view similar to FIG. 1 of a modified plant.

In FIG. 3, I show a system similar to that of FIG. 1 wherein, however, the blast furnace 500 has its outlet pipe 501 entering the combustion chamber 502 tangentially so that a vertical or cyclonic movement of the gases is established within this chamber. Flux can be added to the chamber at 503 in the form of limestone dust while oxygen is supplied from the generator 504 to sustain combustion of the exhaust gas at a smelting temperature within the chamber. The blast furnace likewise receives oxygen from the generator 504 via line 505, the blast gas being maintained under pressure by the steam produced by the boiler 506 and the excess steam serving to drive the turbine 16, as previously described. The slag tapped at 507 from the blast furnace is combined with the slag of the smelting chamber 502 at 508, while the iron melt emerging from tap hole 509 of the furnace is combined at 510 with the iron melt from the smelting chamber and led to the mixing vessel. The gases are introduced into the smelting chambers at a gauge pressure of 1000 mm. of water while the exhaust gases emerge via the central tube 511 for admission to the heat exchanger 14, as described with reference to FIG. 1.

The following example illustrates the substitution of oxygen-rich blast gases for the usual blast air in a blast-furnace installation:

*Example*

In a steel-making plant of the type illustrated in FIG. 1 a blast furnace is employed in a conventional manner to produce approximately 33 tons of pig iron per hour, the furnace being tapped in 150-ton batches. The furnace has a diameter at its widest portion of about 7.5 m. and a height of 40 m., the height of the large-diameter portion being 5.5 m. above the tuyères. When the furnaces operate in a conventional manner, four Cowper-type hot-blast stoves each having a height of about 30 m. and a diameter of about 5 m. are employed to raise the blast air to a temperature of 1000° C. About $2.5 \times 10^3$ to $3.2 \times 10^3$ m.³ per ton of air is employed at a pressure of 2.5 atmospheres, the inlet velocity being about $10 \times 10^3$ to $13 \times 10^3$ m.³ per hour. The temperature in the bosh and smelting region of the furnace at the tuyère inlets is between 1300 and 1500° C.

With a similar iron-production rate, the air conventionally blown into the furnace in a hot blast is replaced by about $1.2 \times 10^3$ to $1.5 \times 10^3$ m.³ per ton of pig iron of a gas enriched in oxygen (90% $O_2$, the remainder nitrogen). The gas is employed at a pressure of about 2.5 atmospheres and a gas velocity corresponding to the furnace output of 32 tons per hour. The oxygen-enriched gas is heated to a temperature of 500° C. by heat exchange with the flue gases of the furnace. An operating temperature of about 1300° C.–1400° C. is maintained in the region of the tuyères. When somewhat higher temperatures (e.g. 1500° C.) are required, between $1.6 \times 10^3$ and $2.0 \times 10^3$ m.³ of the oxygen-enriched gases are used per ton of pig iron at the indicated pressure. When the temperature in the region of the tuyères tends to rise to an undesirably high level in excess of 1500° C., water vapor is added to the blast gas up to an amount of about 10%. When the oxygen-enriched gas is employed, at most two of the Cowper-type gas heaters are necessary, an additional heater generally being provided for interchange with the operative ones.

It should be noted that, in addition to heating the blast gas recuperatively from the sensible or combustion heat of the exhaust gas, the blast gas can be passed in heat exchanging relationship with the discharge troughs of the blast furnace of FIGS. 1 and 3 so that part of the sensible heat of the ore and/or the molten iron is used to heat the blast gas.

While the system of FIG. 1 employs all of the steelmaking stages in stepped relationship, it should be noted that various modifications of this arrangement are also possible. Prior to discussion some of the modifications in detail with respect to FIGS. 4–8, it should be noted that, in the system of FIG. 1, the scrap iron can be added to the pig- or crude-iron melt 111, i.e. along the trough 104, as well as to the mixing vessel 202. The scrap iron, and other alloying ingredients, as desired, may be supplied in solid or liquid form, while it is preferred to employ natural stepped portions of a hilly terrain for the construction of the plant in this manner, and, in general, steel plants are provided in hilly areas because of the proximity of mountains containing iron ore, coal or limestone, it is also possible to mount the various stages at different levels by means of towers or pedestals or produce the stepped levels by excavation or filling.

Figure 4:
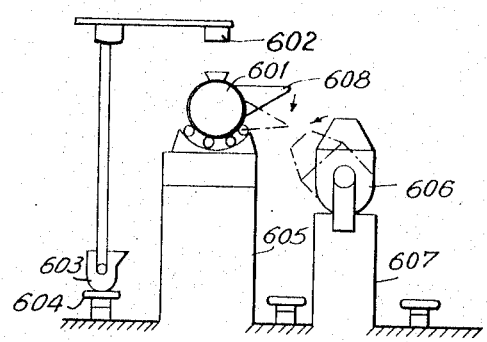
FIG. 4 is a diagrammatic elevational view of the mixer and converter arrangement of still another installation.
Figure 5:
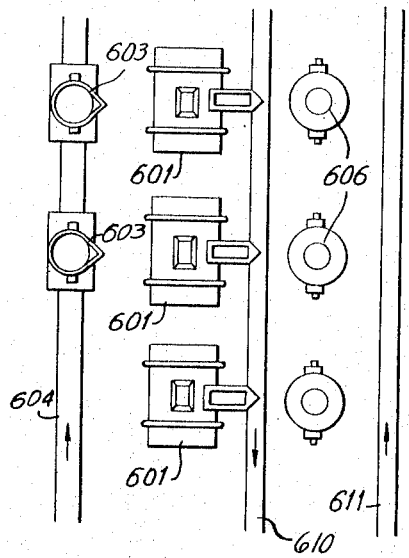
FIG. 5 is a plan view of the installation of FIG. 4.

While it is desirable to have all stages in stepped relationship, it should be noted that advantage is also gained when only the raw-iron mixer and the converter are disposed with horizontal and vertical offsetting. In FIGS. 4 and 5 I show an arrangement of this type. In this portion of the steel-making plant, a plurality of mixers 601 are provided. These mixers being serviced by one or more cranes 602 which engage ladles 603 carried by crude-iron transport conveyor 604 to elevate these ladles and dump their molten contents into the several mixers. The use of the conveyor 604 eliminates the need for a multiplicity of cranes capable of movement transversely to the array of mixers. The latter are mounted upon towers or pedestals 605 so that they are disposed above the swingable converters 606, whereas towers 607 are shorter. The spout 608 of each mixer is adapted to discharge the contents thereof into the respective converter 606; during transfer, the mixer and the respective converter are tilted toward one another. The converters 606 can be dumped in either direction in order to first discharge slag and then discharge molten steel into ladles carried by the conveyors 610 and 611, respectively.

Figure 8:
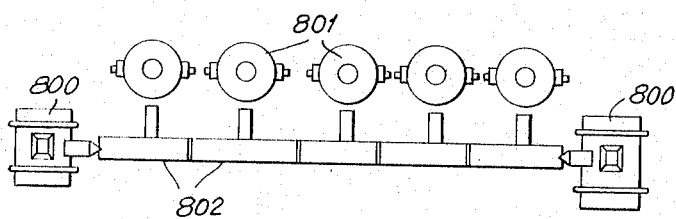
FIG. 8 is a top-plan view of still another arrangement for supplying molten metal from the mixer to the converter arrangement of a steel plant.
Figure 6:
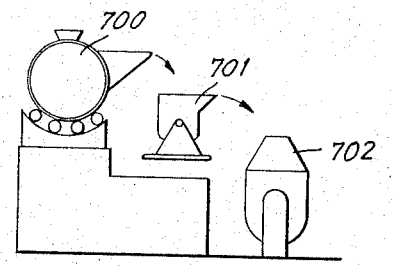
FIG. 6 is a view similar to FIG. 4 of still another arrangement.
Figure 7:
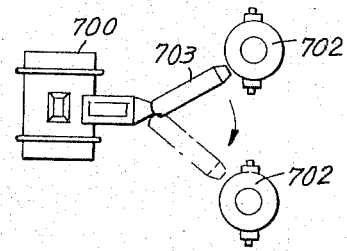
FIG. 7 is a plan view of a modification of a portion of the plant shown in FIG. 1.

In FIG. 6 I show an arrangement wherein the mixer 700 empties into a stationary ladle or crucible 701, in which the melt is temporarily retained, prior to tilting of this crucible to discharge its contents into the converter 702. In the arrangement of FIG. 7, the mixer 700 empties its load into a trough-shaped receptacle 703 which is tiltable in the vertical direction and swingable about a vertical axis to selectively discharge its contents into a pair of converters 702. In the modification of FIG. 8, two mixers 800 supply molten-iron to five converters 801 by way of troughs 802, no cranes being required for this purpose.

What is claimed is:

1. A method of operating a blast-furnace installation wherein a blast furnace is provided with tuyères below a smelting zone at the base of the furnace and above a bath of molten iron and with a heat exchanger for recuperative utilization of blast-furnace exhaust gas, said method comprising the steps of charging said furnace with a charge consisting essentially of iron ore, slag-forming flux and coke; maintaining a temperature of substantially 1300° to 1500° C. in said smelting zone; introducing into said furnace at said tuyères a blast gas containing oxygen for reaction with said coke to produce carbon monoxide for reaction with said charge and reduction of said iron ore to molten iron while producing said exhaust gas at a temperature of at least 400° C., said exhaust gas containing iron-oxide particles; injecting water vapor into said furnace at vertically spaced locations therealong above said smelting zone to control the temperature passing said exhaust gas containing iron-oxide particles from the blast-furnace to a reaction chamber; and effecting partial combustion of said exhaust gas in said reaction chamber to supply heat and the reducing atmosphere therein, said reducing atmosphere causing reduction of said iron-oxide particles to iron and said heat causing melting of the same, thereby obtaining molten iron in said reaction chamber.

2. A method of operating a blast-furnace installation wherein a blast furnace is provided with a tuyères below a smelting zone at the base of the furnace and above a bath of molten iron and with a heat exchanger for recuperative utilization of blast-furnace exhaust gas, said method comprising the steps of charging said furnace with a charge consisting essentially of iron ore, a slag-forming flux and coke; maintaining a temperature of substantially 1300° to 1500° C. in said smelting zone; introducing into said furnace at said tuyères a blast gas consisting in major part of oxygen for reaction with said coke to produce carbon monoxide for reaction with said charge and reduction of said iron ore to molten iron while producing said exhaust gas at a temperature of at least 400° C., said exhaust gas containing iron-oxide particles; removing said iron-oxide particles from said exhaust gas upon passage thereof from said furnace by reacting said iron-oxide particles with a flux and a reducing gas to form iron particles therefrom and simultaneously smelting said particles by at least partial combustion of said exhaust gas to form a melt of iron therefrom in a reaction chamber intermediate said furnace and said heat exchanger without reducing the temperature of said exhaust gas, employing at least the sensible heat of said exhaust gas to heat said blast gas to a temperature of about 500° to 600° C. in said heat exchanger, generating water vapor in said reaction chamber with said exhaust gas; and introducing between substantially 1 and 10% by volume of said water vapor with said blast gas into said tuyères.

3. A method of operating a blast-furnace installation wherein a blast furnace is provided with tuyeres below a smelting zone at the base of the furnace and above a bath of molten iron and with a heat exchanger for recuperative utilization of blast-furnace exhaust gas, said method comprising the steps of charging said furnace with a charge consisting essentially of iron ore, a slag-forming flux and coke; maintaining a temperature of substantially 1300° to 1500° C. in said smelting zone; introducing into said furnace at said tuyères a blast gas consisting in major part of oxygen for reaction with said coke to produce carbon monoxide for reaction with said charge and reduction of said iron ore to molten iron while producing said exhaust gas at a temperature of at least 400° C., said exhaust gas containing iron-oxide particles; removing said iron-oxide particles from said exhaust gas upon passage thereof from said furnace by reacting said iron-oxide particles with a flux and a reducing gas to form iron particles therefrom and simultaneously smelting said particles by at least partial combustion of said exhaust gas to form a melt of iron in a reaction chamber intermediate said furnace and said heat exchanger without reducing the temperature of said exhaust gas; employing at least the sensible heat of said exhaust gas to heat said blast gas to a temperature of about 500° to 600° C. in said heat exchanger, generating water vapor in said reaction chamber with said exhaust gas; and introducing between substantially 1 and 10% by volume of said water vapor with said blast gas into said tuyères; removing said molten iron from said furnace and combining it with said melt in a liquid state; and injecting water vapor into said furnace at vertically spaced locations therealong to control the temperatures of said charge at said locations.

4. In a method of operating a blast-furnace installation, the steps of directing exhaust gas containing iron-oxide particles from a blast-furnace to a reaction chamber, and effecting partial combustion of said exhaust gas in said reaction chamber to supply heat and the reducing atmosphere therein, said reducing atmosphere causing reduction of said iron-oxide particles to iron and said heat causing melting of the same, thereby obtaining molten iron in said reaction chamber.

5. In a method as recited in claim 4 and wherein iron ore is reduced to molten iron in the blast-furnace while producing said exhaust gas, the step of removing said molten iron from said furnace and combining it with said molten iron from said reaction chamber.

References Cited

UNITED STATES PATENTS

| | | | |
|---|---|---|---|
| 1,092,168 | 4/1914 | Prudhomme | 75—41 |
| 1,309,465 | 7/1919 | Dougherty | 75—41 |
| 2,560,471 | 7/1951 | Platon | 75—41 |
| 1,518,854 | 12/1924 | Kirby | 75—41 |
| 1,824,960 | 9/1931 | Lawaczeck | 75—41 |
| 2,131,031 | 9/1938 | Avery | 75—41 |
| 2,254,660 | 9/1941 | Koller et al. | 75—41 |
| 2,598,735 | 6/1952 | Webb | 75—41 X |
| 2,650,161 | 8/1953 | Totzek | 75—41 |
| 2,715,575 | 8/1955 | Coutant | 75—41 |
| 2,781,255 | 2/1957 | Krivsky et al. | 75—25 |
| 2,795,497 | 6/1957 | Elvander | 75—41 |
| 2,833,643 | 5/1958 | Newman | 75—41 |
| 2,859,954 | 11/1958 | Grey. | |

DAVID L. RECK, *Primary Examiner.*

HYLAND BIZOT, *Examiner.*

H. W. TARRING, *Assistant Examiner.*